July 31, 1923.  
J. M. MUNDY  
MEANS FOR SECURING TIRES TO VEHICLE WHEELS  
Filed Oct. 7, 1920  
1,463,291  
2 Sheets-Sheet 1
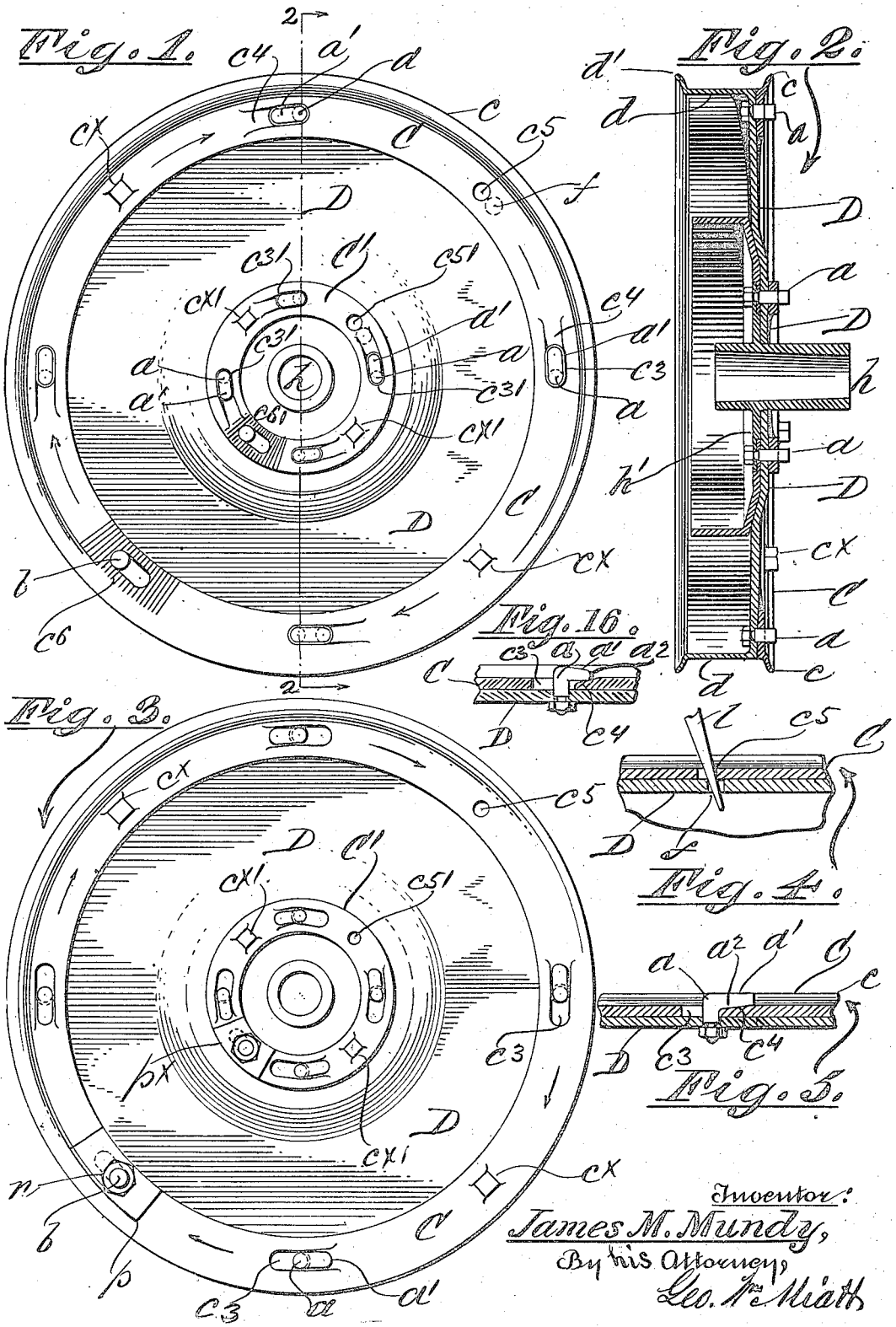
Inventor:  
James M. Mundy,  
By his Attorney,  
Geo. W. Miatt

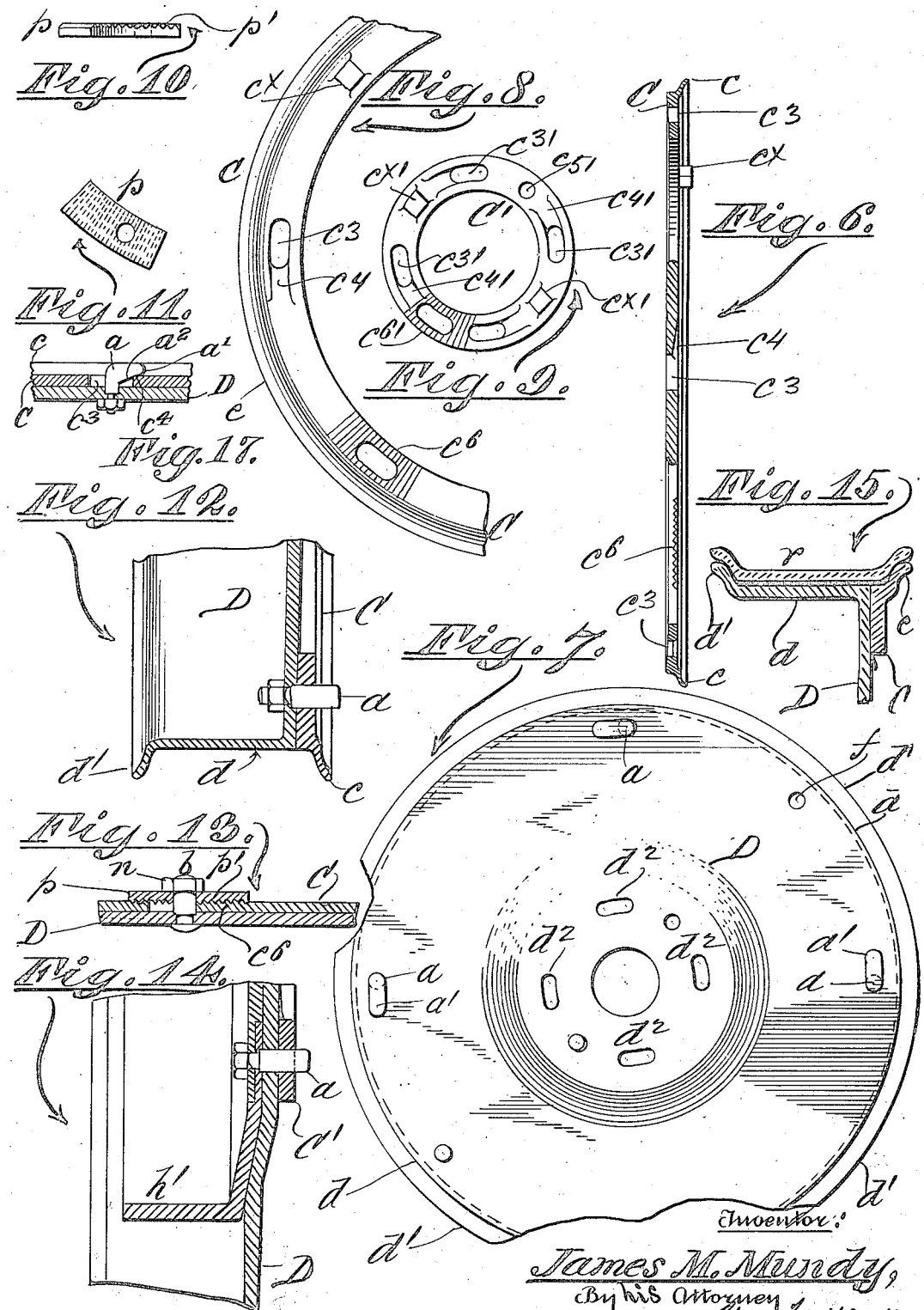

Patented July 31, 1923.

1,463,291

UNITED STATES PATENT OFFICE.

JAMES M. MUNDY, OF BROOKLYN, NEW YORK.

MEANS FOR SECURING TIRES TO VEHICLE WHEELS.

Application filed October 7, 1920. Serial No. 415,425.

*To all whom it may concern:*

Be it known that I, JAMES M. MUNDY, a citizen of the United States, and a resident of the borough of Brooklyn, county of Kings, city and State of New York, have invented certain new and useful Improvements in Means for Securing Tires to Vehicle Wheels, of which the following is a specification.

My improvements relate to wheels of the type in which demountable tires are used, especially elastic resilient tires, pneumatic or otherwise, as in the case of automobiles etc. In my concurrent application Serial No. 361,905, filed Feb. 27, 1920, I show and describe the essential features of my invention as applied to wheels of the class designated having spokes and felloes, and provided with demountable rims interposed between the peripheries of the felloes and the elastic resilient tires, in a manner well known in the art.

In the present case my improvements relate more particularly to a comparatively new form of wheel of recent vogue in which the demountable rim may or may not be used in the mounting of the elastic resilient tire, and in which the spokes and felloe, so called, of the older form of wheel are practically eliminated,—such new wheels being known as of the disc type, in which a metallic plate replaces the spokes, and the felloe is superseded by a peripheral flange adapted to support the tire, either directly, or indirectly by means of a demountable rim. In other words, my present invention consists essentially in adapting the principle of my annular wedgeable clamping plate to the disc wheels, both for the purpose of detachably mounting an elastic resilient tire thereon, and also for detachably securing the disc wheel to its hub, as hereinafter fully set forth.

In the accompanying drawings,

Fig. 1, is an elevation of the outer face of a disc wheel to which my wedgeable annular clamping plates are applied, said clamping rings being shown in detachable positions;

Fig. 2, is a section taken upon plane of line 2—2, Fig. 1;

Fig. 3 is an elevation like unto Fig. 1, showing my annular clamping plates in wedged position on the disc wheel;

Fig. 4 is a sectional detail illustrating a means of tightening my annular clamping plates by a pry implement.

Fig. 5, is a sectional detail illustrating the contactual engagement between wedge plate and attachment lugs;

Fig. 6, is a sectional elevation of the flanged annular clamping plate shown in Figs. 1, 2 and 3, broken away in part to show one of the wedging surfaces;

Fig. 7, is an elevation, broken away in part of the disc wheel shown in the preceding figures;

Fig. 8 is an elevation of a portion of the annular tire clamping plate.

Fig. 9 is a detail elevation of the annular hub clamping plate.

Fig. 10 is an edge view of one of the lock plates;

Fig. 11 is a view of the outer side thereof, the serrations on the other side being indicated by dotted lines;

Fig. 12 is a sectional detail showing one of the attachment lugs, etc.;

Fig. 13, is a sectional detail illustrating the function of the locking plates.

Fig 14, is a sectional view showing details relating to the annular club clamping plate;

Fig. 15, is a sectional detail illustrating the mounting of a detachable rim on the felloe flange by means of my wedgeable clamping plate;

Figs. 16 and 17 are sectional details like unto Fig. 5, showing modifications in the positioning of the wedge plates.

The main disc portion D of the wheel is formed with, or having rigidly incorporated therewith, a peripheral rim flange $d$, which is the equivalent of the felloe of the older form of wheel, such as illustrated in my concurrent application Serial No. 361,905. In fact, for convenience of description, this main peripheral disc rim may be designated as the felloe rim, $d$, since the disc support of which it forms an integral part functions in lieu of the spoke support of the older wooden felloe. This felloe rim $d$, is formed with an out-turned peripheral edge flange $d'$, affording lateral support on that side of the felloe flange $d$, either for a demountable rim on which an elastic resilient tire is positioned in a manner well known in the art, or directly for the mounting and support of such an elastic resilient tire when the said demountable rim is dispensed with, in which case the flanges $d$, $d'$, $c$, function as the equivalent of the demountable rim. In either case my wedgeable clamping plate C, constitutes the means by which the elastic resilient tire is demountably positioned on the felloe rim $d$, $d'$, of the disc wheel, said wedgeable clamping plate C, being formed with a peripheral edge flange $c$, which acts in conjunction with that ($d'$) on the felloe flange $d$, to support the tire mount, either directly or indirectly, laterally on said felloe flange $d$, $d'$.

My wedgeable clamping plate C, is preferably annular in shape, and fits against the front side of the spoke disc structure D, its peripheral diameter (aside from its edge flange $c$) being the same as that of the felloe flange $d$, of said spoke disc structure D, as shown more particularly in Figs. 2, 12, and 15. The clamping plate C, is supported on the spoke disc face by a plurality of attachment lugs $a$, $a$, protuberant from the outer side of said disc, D, and each formed with a shoulder $a'$, adapted to overlap the outer face of said wedgeable clamping plate C, which latter is formed with elongated concentric slots $c^3$, $c^3$, for the accommodation of said attachment lugs $a$, $a$. In the drawings the wheel is shown with four of these attachment lugs $a$, $a$, although I do not limit myself in this respect, since three, five, or any desired plural number may be provided, according to preference or requirements.

The contactual surfaces $a^2$ of the shoulders $a'$, of the attachment lugs $a$, $a$, and the corresponding contactual surfaces $c^4$, of the annular wedgeable clamping plate C, may both be correspondingly inclined with relation to each other, as shown in Fig. 5, so as to attain mutually a close, wedge-like engagement,—or either one or the other of the interlocking contactual surfaces named ($a^2$, $c^4$) may be inclined to function as wedges, as illustrated in Figs. 16 and 17,—the essential feature in this respect being an inclined wedgeable contactual engagement between the annular clamping plate C and the attachment lugs $a$, $a$, which will insure the pressing of said clamping plate C, tightly against the outer side face of the "spoke" disc D, when the said wedgeable clamping plate C, is forcefully turned in the direction of the arrows, Figs. 1 and 3, thereby securing the elastic resilient tire in operative position on the periphery of the wheel, either directly, or indirectly, as heretofore intimated. Thus in Fig. 17, the inclined surface $a^2$, of the attachment lug $a$, performs the function of a wedge when the opposed edge $c^4$, of the slot $c^3$, is driven against it, while conversely, in Fig. 16, the inclined surface $c^4$, of the clamping plate C, acts as a wedge when driven against the end $a^2$, of the shoulder $a'$, of the attachment lug $a$,—the result being the same in all three constructions shown in Figs. 5, 16 and 17, respectively, in that the plural wedging operation involved in the forceful turning of the annular wedgeable clamping plate C, in the direction of the arrows Figs. 1, and 3, insures the retention of the tire upon the periphery of the wheel.

To facilitate the wedging operation above set forth the wedgeable annular clamping plate C, is formed on its outer face with two or more thrust shoulders $c^x$, $c^x$, which may be utilized in partially and forcefully rotating the said wedgeable annular clamping ring C, in either direction, as in the direction of the arrows Figs. 1 and 3, for tightening purposes, or in the opposite direction as indicated by the arrows Fig. 15, for the purpose of loosening said wedgeable clamping plate C, from the face of the spoke disc D, as may be required.

Other and auxiliary means may also be provided for tightening or loosening the annular wedgeable clamping plate C, as related to the wheel disc D. Thus, said annular wedgeable clamping plate C, may be formed with a pry hole $c^5$, for use in conjunction with a fulcrum hole $f$, in the face of the said wheel disc D, the pointed end of a suitable lever or implement $l$, being inserted through the clamping plate pry hole $c^5$, and into the fulcrum hole $f$, in the spoke disc D, as illustrated in Fig. 4, and the lever $l$, being used to pry the wedgeable clamping plate C, home against the attachment lugs $a$, $a$, or to loosen it therefrom, as required.

To effectually and positively lock the annular clamping plate C, in wedged position on the spoke disc D, I form said wedgeable clamping plate C, with a series of transverse corrugations, $c^6$, $c^6$, for engagement with a lock plate $p$, the inner side of which is formed with transverse corrugations $p'$, corresponding with the said corrugations $c^6$, $c^6$, on the wedgeable clamping plate and adapted to co-act therewith in securing the said annular clamping plate C, against slip or retractile movement when wedged to the spoke disc D, as above set forth,—the lock plate $p$, being secured rigidly in position by means of a screw bolt $b$, attached to and protuberant from the face of said disc D, and passing through said wedgeable clamping plate C, and engaging with a binding nut $n$, as shown more particularly in Figs. 3 and 13, of the drawings.

The annular wedgeable clamping plate C, is preferably made continuous throughout its circumference as shown in the drawings, although if desired for any reason it may be split as shown and described in my aforesaid concurrent application Serial No. 361,905, in which case the corrugations $c^6$, $c^6$, are formed on either side of the split,—the lock plate $p$, when in position, overlapping the opposed ends of the wedgeable clamping plate C, so as to secure each end and half of said wedgeable clamping plate C, against retractile movement when locked in position upon the spoke disc D.

When formed in a single piece my annular clamping plate C, thus constructed and arranged in conjunction with the attachment lugs $a$, $a$, affords many practical advantages over the prior state of the art. Thus, by the removal of a single bolt $b$, and the forceful tapping of one or more of the thrust shoulders $c^x$, the clamping plate C, may be quickly and conveniently loosened up for removal to admit of the substitution of a new tire, and as quickly replaced and firmly secured in position,—the single bolt $b$, being the only removable and replaceable securing means other than the annular clamping plate itself, and the latter, by its wedge-plane contactual engagement with the plurality of attachment lugs $a$, $a$, enables me to dispense with the plurality of bolts heretofore requisite to secure the tire to the rim of the wheel. Hence the time and labor involved in replacement of tires is materially lessened by my invention as compared with the methods and means heretofore in vogue, where a plurality of screw bolts has been deemed essential for the purpose.

Thus far I have described my wedgeable clamping plate as positioned circumferentially upon the spoke disc D, and acting in conjunction with the edge flange $d'$, on the felloe flange $d$, thereof, in a manner analogous to that shown in my aforesaid concurrent application Serial No. 361,905.

While thus providing for the expeditious substitution of the elastic resilient wheel tire, I also provide duplicate means whereby the whole wheel may be quickly detached from its hub support, and another substituted in an emergency where time is an important factor, as in the case of fire apparatus, ambulances, etc., where the practically instantaneous replacement of a complete wheel would be a desideratum.

Thus, in the arrangement shown in Figs. 1, 2, 3, 8 and 9, I secure attachment lugs $a$, $a$, to the brake drum or other flanged portion $h'$, of the hub $h$, and form the spoke disc D, with a series of concentric slots $d^2$, $d^2$, (Fig. 7) through which said attachment lugs $a$, $a$, protrude, for engagement with the wedgeable portions of the auxiliary wedgeable clamping plate C′, which in every respect except diameter is a counterpart of the larger wedgeable clamping plate C, which is positioned circumferentially on said disc D,—the mode of detachable application of the said inner auxiliary wedgeable clamping plate C′, being essentially the same as that described in connection with the said circumferential clamping plate C. For this reason the said central auxiliary wedgeable clamping plate C′, is provided with its own drive shoulders $c^{x'}$, wedge surfaces $c^{41}$, pry hole $c^{51}$, corrugated portion $c^{61}$, and lock plate $p$, the latter being secured in position by means of a bolt and nut substantially as illustrated in Fig. 13.

From the foregoing it will be seen that the essential feature of my present invention is the use of clamping means such as herein designated whereby a tire may be demountably secured to a disc wheel, and the disc wheel demountably secured to its hub section,—said wedgeable clamping means comprising a plurality of elongated concentric slots $c$, in conjunction with attachment lugs $a$, protuberant from the supporting part,—the contactual engagement between said attachment lugs $a$, and the edges of the said concentric slots $c$, being wedgeable, as and for the purpose set forth. A supplementary feature is the locking means provided for positively but detachably insuring the wedged co-relation of said parts by the means of a single screw bolt, whereby immediate substitution may be effected in case of emergency, obviating delay that might otherwise result disastrously.

What I claim as my invention and desire to secure by Letters Patent is,

A wheel of the character designated, comprising a spoke disc formed with a flanged peripheral felloe rim and a fulcrum hole in its face, a flanged annular clamping plate fitted to the face of the spoke disc and formed with a pry hole positioned with relation to the aforesaid fulcrum hole in the spoke disc and also formed with a plurality of elongated concentric slots, shouldered attachment lugs protuberant from the face of said spoke disc and fitting in said elongated concentric slots in the annular clamping plate, the contactual surface engagement between said shouldered attachment lugs and the outer face of said annular clamping plate being wedgeable, and means for locking said annular clamping plate and shouldered attachment lugs on the spoke disc in wedged relationship, for the purpose described.

JAMES M. MUNDY.

Witnesses:
 Geo. Wm. Miatt,
 Dorothy Miatt.